(12) United States Patent
O'Connor (10) Patent No.: US 6,408,378 B2
(45) Date of Patent: Jun. 18, 2002

(54) MULTI-BIT SCOREBOARDING TO HANDLE WRITE-AFTER-WRITE HAZARDS AND ELIMINATE BYPASS COMPARATORS

(75) Inventor: Dennis M. O'Connor, Chandler, AZ (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 09/872,174

(22) Filed: May 31, 2001

Related U.S. Application Data (63) Continuation of application No. 09/055,039, filed on Apr. 3, 1998, now Pat. No. 6,266,766.

(51) Int. Cl.[7] .................................................. G06F 9/34
(52) U.S. Cl. ........................ 712/217; 712/216; 712/218
(58) Field of Search ................................ 712/216, 217, 712/218

(56) References Cited

U.S. PATENT DOCUMENTS

| | | | | |
|---|---|---|---|---|
| 5,634,026 A | * | 5/1997 | Heaslip et al. ............... | 712/217 |
| 5,682,493 A | * | 10/1997 | Yung et al. .................. | 712/217 |
| 5,699,537 A | * | 12/1997 | Sharangpani et al. ....... | 712/217 |
| 5,737,629 A | * | 4/1998 | Zuraski, Jr. et al. .......... | 712/23 |
| 5,872,986 A | * | 2/1999 | Heeb .............................. | 712/1 |
| 5,974,538 A | * | 10/1999 | Wilmot, II ................... | 712/218 |
| 6,145,074 A | * | 11/2000 | Asato ........................... | 712/218 |

* cited by examiner

Primary Examiner—Kenneth S. Kim
(74) Attorney, Agent, or Firm—Blakely, Sokoloff, Taylor & Zafman LLP (57) ABSTRACT

An apparatus and method of multi-bit scoreboarding to handle write-after-write hazards and eliminate bypass comparators. The method comprises providing a set of data storage units that include a set of scoreboard return path bits associated with the data storage units. The scoreboard return path bits include a set of return path indicators. A first execution unit is provided to provide an output based on an input. A first switching unit is provided to select the input to the first execution unit and to receive the output from the first execution unit. A first bypass control unit is provided to cause the first switching unit to couple the output the output from the first execution unit to the first execution unit based on the scoreboard return path bits, such that the input to the first execution unit is selected from among the data storage units and the output from the first execution unit.

7 Claims, 4 Drawing Sheets

MULTI-BIT SCOREBOARDING TO HANDLE WRITE-AFTER-WRITE HAZARDS AND ELIMINATE BYPASS COMPARATORS

This is a continuation of application with Ser. No. 09/055,039 filed Apr. 3, 1998 now issued U.S. Pat. No. 6,266,766.

BACKGROUND OF THE INVENTION

1. Field of the Invention

The present invention relates to the field of use of register files. More particularly, the present invention relates to using additional bits in the register file to handle write-after-write hazards and eliminate bypass comparators.

2. Description of Related Art

Register files are arrays in processors that store one or more registers. In processors capable of processing more than one instruction at a time, it is common to associate with each of these registers a bit which indicates whether the data inside each respective register is either: (1) updated and ready to be used; or, (2) being modified or produced and therefore not available. This bit is termed a "scoreboard" bit.

For example, if a scoreboard bit for a particular register is set, then the next instruction which needs to access this register cannot execute until the scoreboard bit for this register has been cleared. To clear this register bit, a preceding operation (i.e., the operation that is generating/modifying the data to be placed/returned to this register) needs to complete execution. Thus, if a program were to (1) execute a LOAD of a first value and place it into a register R4; and (2) execute an ADD of the first value with a second value contained in a register R5; then there is clearly a dependency on the LOAD operation. The use of the scoreboard bit by a circuit to "lock-out" access to a register that is being used is referred to as a "hardware interlock." The hardware interlock is used instead of placing the extra burden in software.

Thus, in a processor where there exists multiple execution units, and where one of the execution units has an operation that is waiting to be executed that depends on a result from a previous operation, the register that is waiting to receive the result is "locked-out" from being accessed until the register's scoreboard bit is cleared. After the result has been placed into the register and the scoreboard bit has been cleared, the execution unit containing the waiting operation can access the data in the register.

In cases where an operation is waiting for a result to return from an execution unit, time can be saved by not having to wait for the result to be first placed into the register and then read out again by the waiting execution unit. Instead, bypassing is used to send the result to the waiting execution unit at the same time the result is sent to the register—significantly speeding-up operations.

Bypassing is used where a processor contains some collection of data in a register file and also contains a set of execution units, each of which may take a varying amount of time to complete an operation. An execution unit can take a varying amount of time to complete an operation because, for example, the execution unit is a multicycle execution unit or because the processor has a pipelined implementation where no operation finishes immediately.

Without bypassing, an execution unit that is waiting for another operation to finish must wait until that operation is finished and the result sent back to the register file before reading the result out again. The execution unit must also wait until the scoreboard bit for the result is cleared and the result is read out before the instruction is issued. Thus, the time that elapses during the writing of the result into the register file and the reading out of the result again before the execution of the instruction that depends on the result adds additional delay.

Figure 1:
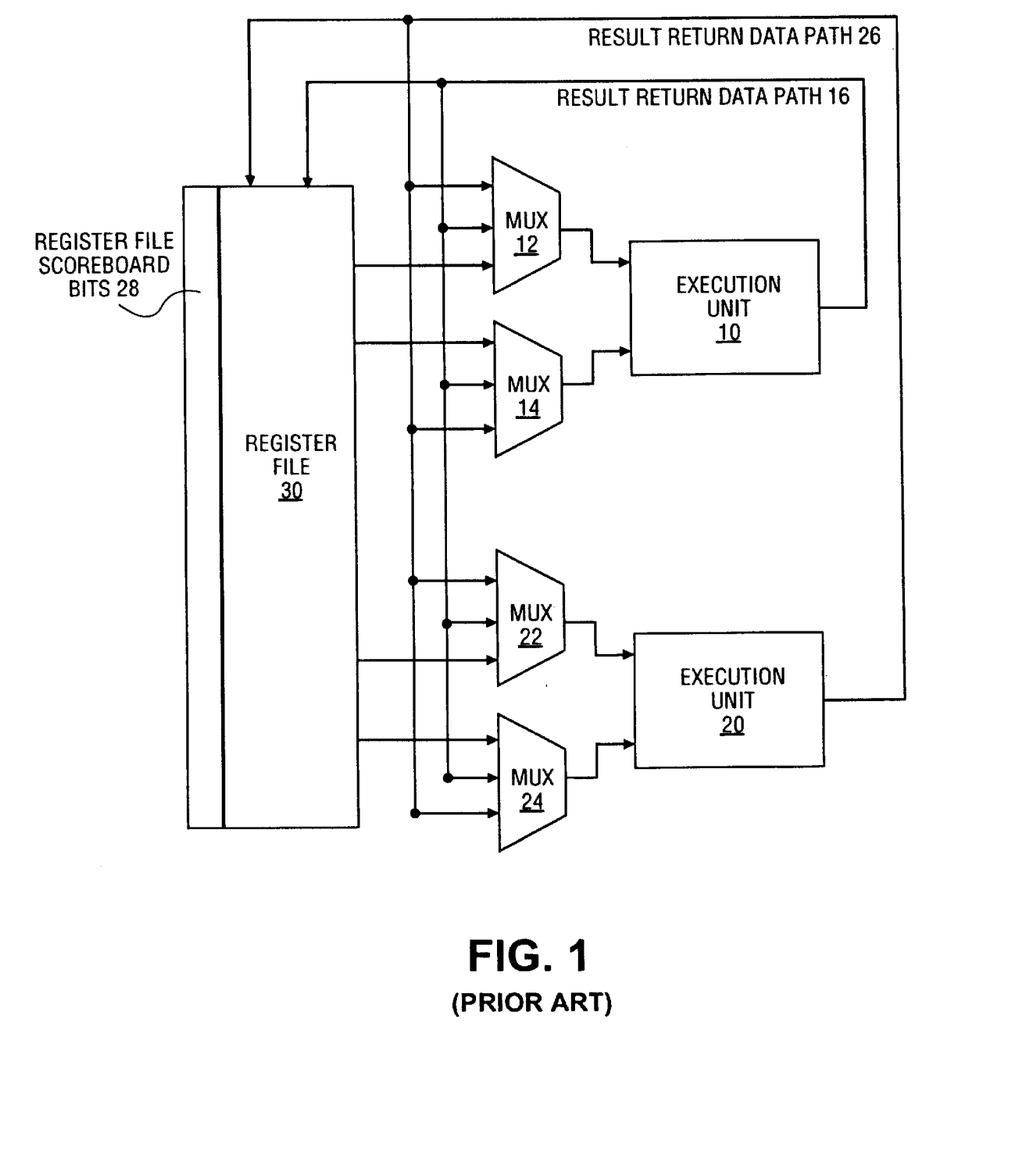
FIG. 1 is a block diagram of a prior art system for bypassing data having a multiplexor for selecting bypass data.

FIG. 1 shows a prior art bypass circuit where a set of multiplexors (MUX) 12, 14, 22, and 24 is placed into a set of result return data paths 16 and 26. Set of result return data paths 16 and 26 returns results from execution units 10 and 20, respectively, to a register file 30 (no control circuit is shown in FIG. 1 for simplicity).

FIG. 1 contains a set of register file scoreboard bits 28 along with register file 30. The output of register file 30 is fed to MUX 12, MUX 14, MUX 22, and MUX 24. The output of MUX 12 is used as one input to execution unit 10, while the output of MUX 14 is used as the other input to execution unit 10. The output of MUX 22 is used as one input to execution unit 20, while the output of MUX 24 is used as the other input for execution unit 20.

The output of execution unit 10 is returned on a result return data path 16 to register file 30. Similarly, the output of execution unit 20 is returned to register file 30 on a result return data path 26. Note that result return data path 16 and result return data path 26 might also be used by other execution units not shown in the figure. In addition, MUX 12, MUX 14, MUX 22, and MUX 24 receive both the output from execution 10 and the output from execution 20 through the use of result return data path 16 and result return data path 26, respectively.

Thus, in FIG. 1, every input of every execution unit has one three (3) input multiplexor that provides, as input, either the output of the register file or the result that is returning on one of the two result return data paths. As described below, every execution unit may also be able to latch the values that appear on its inputs, to handle situations where all the inputs are not available simultaneously.

For example, if execution unit 10 is an adder which executes in one cycle and the next instruction, which is also an ADD instruction, needs the result, both operations can issue sequentially because the result from the first ADD instruction is written into the register file at the same time that result is bypassed into the adder again so that the subsequent ADD can use it immediately.

The output of each MUX selects the data from one of three inputs depending on which control line is active. The control lines come from the system described in FIG. 2, below.

Figure 2:
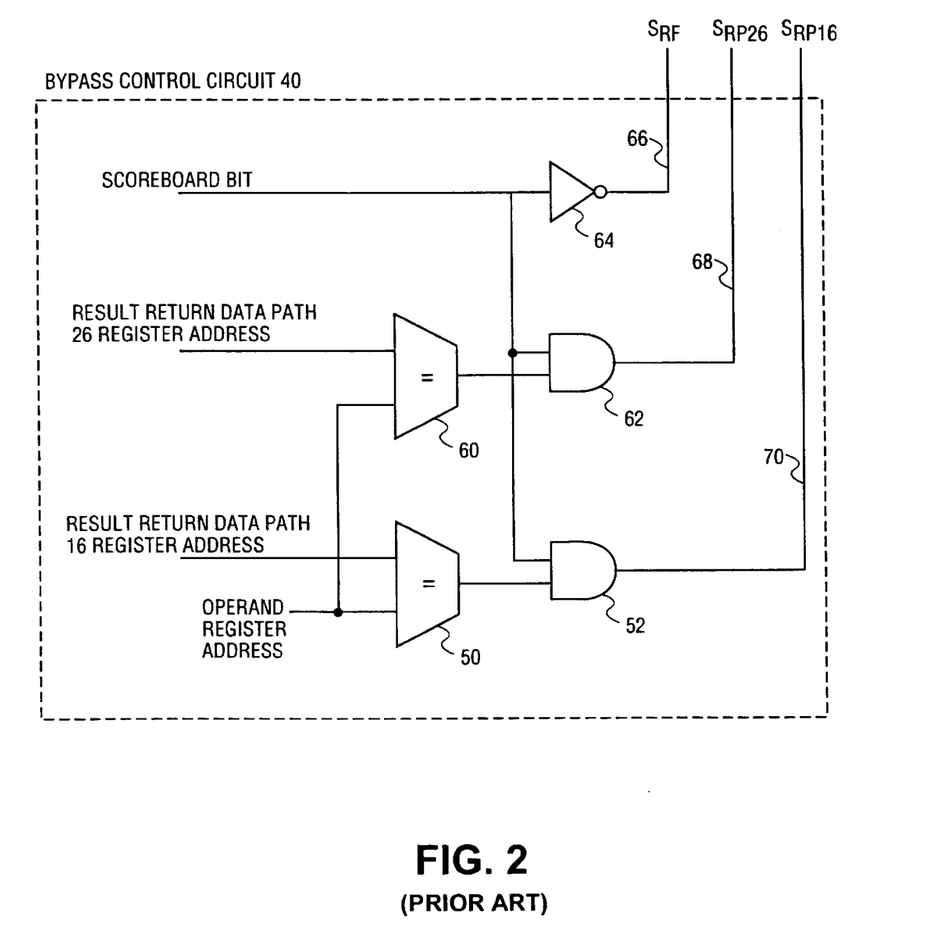
FIG. 2 is a block diagram of a prior art control system for controlling the multiplexor of the prior art system for bypassing data.

FIG. 2 shows a bypass circuit 40 having a select register file control line ($S_{RF}$) 66, a select B1 control line ($S_{B1}$) 68, and a select B2 control line ($S_{B2}$) 70 for determining from where an execution unit receives an operand. $S_{RF}$ 66, $S_{B1}$ 68, and $S_{B2}$ 70 are sent to one of the MUX's of FIG. 1. Thus, each of the MUX's in FIG. 1, specifically, MUX 12, MUX 14, MUX 22 and MUX 24, receive control signals $S_{RF}$ 66, $S_{B1}$ 68, and $S_{B2}$ 70 from a bypass control circuit similar to bypass control circuit 40. A scoreboard bit line, coming out of register file 30, in FIG. 2 provides the value of the scoreboard bit for the particular register being accessed for determining whether to use the value from the register file or a value from one of the result return data paths.

Bypass circuit 40 also contains a first comparator 50 and a second comparator 60. One of the inputs for both first comparator 50 and second comparator 60 indicates the operand register address of the operand for which the current operation is waiting. For first comparator 50, the other input is the result return data path 16 register address, which indicates the register file address into which the result contained on result return data path 16 is returned after first execution unit 10 has completed the previous operation. For second comparator 60, the other input is the result return data path 26 register address, which indicates the register file address into which the result contained on result return data path 26 is returned after second execution unit 20 has completed the other previous operation.

First comparator 50 and second comparator 60 both operate in the same manner, which is to output a logical one if both inputs are equal. For example, if the operand register address is equal to the result return data path 16 register address, then first comparator 50 outputs a logical one.

The output of first comparator 50 is received by a first AND gate 52. First AND gate 52 also receives the output of a NOT gate 64. Similarly, the output of second comparator 60 is received by a second AND gate 62. Second AND gate 62 also receives the output of NOT gate 64.

The input to NOT gate 64 is the scoreboard bit line, which, as indicated above, provides the value which comes from one of the scoreboard bits from register file scoreboard bits 28. Specifically, the scoreboard bit used is the one associated with the register data being requested by the execution unit.

During operation of the circuit of FIG. 2, if the scoreboard bit coming out of register file scoreboard bits 28 indicates the operand is to be retrieved from register file 30, then the value coming out of the scoreboard is used, as $S_{RF}$ has a value of a logical one. If the scoreboard bit coming from register file scoreboard bits 28 is a logical one, representing that the data in register file 30 is not valid, then the MUX uses the result coming from one of the result return data paths, depending on the output of bypass control circuit 40. Effectively, these three control lines ($S_{RF}$ 66, $S_{B1}$ 68, and $S_{B2}$ 70) together determine whether a valid result is available for the operation and thus allows the processor to issue the instruction and let the instruction execute.

The operand address comes from the instruction word and is the register address where the desired operand for the operation is located. For example, if an instruction is to add the value in register file 30 at location 4 to the value in register file 30 at location 5 and there is no valid data in register file 30 at location 4, then the execution unit executing the instruction waits until it detects a value destined for register file 30 at location 4 being returned on a result return data path before beginning to execute.

A comparator is needed for each possible destination bus to execution unit input combination as any execution unit can be waiting for any result return data path for a result. Therefore, in FIG. 1, where there are two result buses and four total operand inputs, eight comparators are needed because the bypass logic, consisting of two comparators per execution unit input, one for each bus, has to be duplicated for each of these locations.

Generally, the number of comparators increases as the product of the number of execution units and the number of result return data paths. The number of return paths may increase with the number of execution units, to allow all or most of the execution units to be producing results simultaneously. This would lead to the number of comparators increasing as a square factor of the number of execution units. For example, if the number of execution units is doubled, the number of comparators might increase by a factor of 4.

SUMMARY OF THE INVENTION

An apparatus including a set of data storage units having a set of scoreboard bits associated with the set of data storage units. The apparatus also includes a first execution unit having an output coupled to the data storage unit and a first input; a first switching unit having an output coupled to the first input of the first execution unit and a first input coupled to the output of the first execution unit; and, a first bypass control unit coupled to the first switching unit. The first bypass control unit is configured to cause the first switching unit to couple the output of the first switching unit to the first input of the first switching unit based upon the set of scoreboard bits. The system also provides a method including the steps of receiving a first instruction; and, storing a first address location and a first access path specifier for a first operand associated with the first instruction; wherein the first access path specifier indicates a source of the first operand.

DETAILED DESCRIPTION OF THE INVENTION

The present invention provides a method and apparatus for multi-bit scoreboarding. The invention may be used to handle write-after-write hazards, or to reduce or eliminate bypass comparators, or both. For purposes of explanation, specific embodiments are set forth to provide a thorough understanding of the present invention. However, it will be understood by one of ordinary skill in the art, from reading this disclosure, that the invention may be practiced without these details. Further, although the present invention is described through the use of register file scoreboard indicators, most, if not all, aspects of the invention apply to register files in general. Moreover, well-known elements, devices, process steps and the like are not set forth in detail in order to avoid obscuring the present invention.

To eliminate much of the bypass circuitry, additional scoreboard bits in the register file are used to indicate the result bus from which the result is returning in addition to indicating that a result needs to be written back to the register file.

In one embodiment, multiple bits are used, with one of the configurations of the bits being all zeros indicating the result in the register file being valid. In an alternate embodiment, a separate scoreboard bit is used to indicate whether the operand in the register file is valid and an additional set of "return path" bits can be used to indicate the return path for result.

Figure 3:
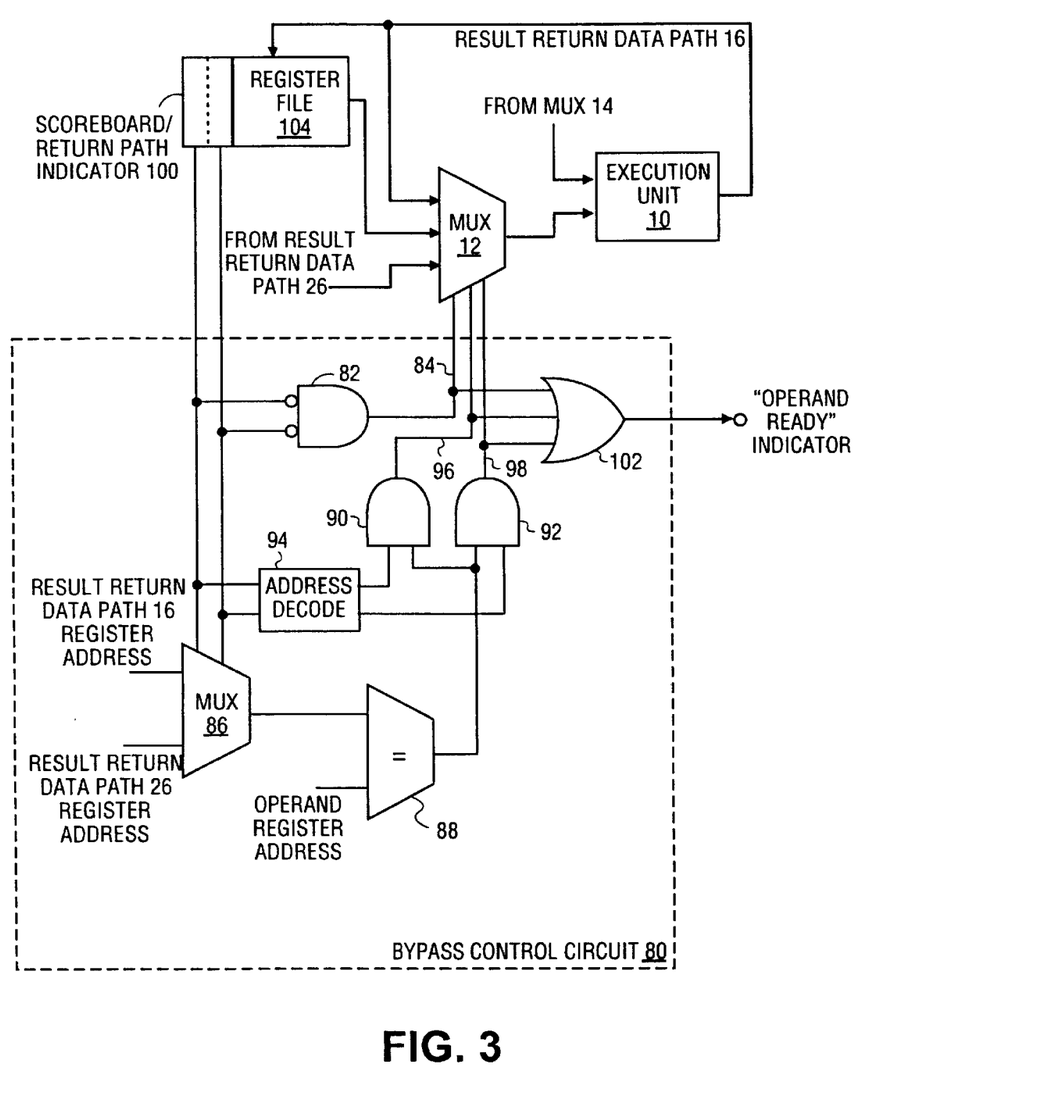
FIG. 3 is a system for bypassing data configured in accordance with one embodiment of the present invention.

FIG. 3 illustrates a bypass control circuit 80 that is configured in accordance with one embodiment of the present invention. Bypass control circuit 80 provides more efficient bypassing, as explained below, and is coupled to a register file 104 having a scoreboard/result path indicator 100 that stores additional information about the status of each register in register file 104.

Bypass control circuit 80 is also coupled to MUX 12 to control the selection of data that is fed into one of the inputs of execution unit 10 from either register file 104, result return data path 16, or result return path 26. In one embodiment, there is also another bypass control circuit (not shown), coupled to control the selection of the data to pass to the other input of execution unit 10. In another embodiment, each MUX of each execution unit has a bypass control circuit similar to bypass control circuit 80. In yet another embodiment, every execution unit may have latches on its inputs, to handle the case where all of its inputs would not otherwise be available at the same time. These latches are controlled using the "operand ready" indicators that are produced by the bypass control circuit associated with each input.

In bypass control circuit 80, an AND gate 82 with logically inverted inputs is used to determine whether or not to use the data contained in register file 30, as explained below. The inputs of AND gate 82 come from scoreboard/result path indicator 100. The output of AND gate 82 is a select register file control line ($S_{RF}$) 84.

If scoreboard/return path indicator 100 shows that the data in register file 30 is not valid (i.e., the data has been scoreboarded), then MUX 86 is used to select and pass through the result return data path register address for the result return data path that is indicated by scoreboard/return path indicator 100. The output of MUX 86 is fed to a comparator 88 that also receives the register address of the operand for which the execution unit is waiting. The output of comparator 88 is provided to a second AND gate 90 and a third AND gate 92, which are used to select between result return data path 16 and result return data path 26, respectively.

If a register has been scoreboarded, address decoder 94 determines which one, if any, of the result return data paths from which a result is to be returned by decoding the bits in scoreboard/return path indicator 100 associated with that register. If address decoder 94 detects that the data that is to be returned into the register is to come from result data path 16, then address decoder 94 asserts a logical one on the output that is coupled to second AND gate 90. Similarly, if address decoder 94 detects that the data that is to return into the register is to come from result data path 26, then address decoder 94 asserts a logical one on the output that is coupled to third AND gate 92.

Bypass control circuit 80 also contains an OR gate 102 which receives the outputs of AND gate 82, second AND gate 90, and third AND gate 92, to indicate an "operand ready" signal. An OR gate is used because when any of the AND gates (i.e., AND gate 82, second AND gate 90, and third AND gate 92), are asserted, there is an operand that is ready to be used.

Continuing to refer to FIG. 3, an example of the functioning of the system is when an instruction is issued to return a result to register 0 [R0]. Thus, R0 has its scoreboard bit set. At the same time the scoreboard bit is set, result return data path indicator information is also encoded into the return path/scoreboard bits to indicate the result return data path from which the result for R0 returns. The information specifying the result return data path on which the result returns may be determined directly from the instruction in some cases, or may need to be obtained from the hardware that decides which execution unit will perform the operation. Then, when a subsequent instruction is issued that needs to use the value in R0 before the first instruction has returned a result in R0, the instruction would "scoreboard" (i.e., the instruction has to wait for the first instruction to return a result to R0 before it can proceed to execute).

In the prior art, bypassing could be implemented constantly only by examining all result return data paths for the result that is to be returned to R0. In contrast, the present system can effect bypassing by only examining the encoding of the return path/scoreboard bits for R0. The encodings and their meanings are as follows:

TABLE 1

Return Path/Scoreboard Bit Encoding

| RP/SCBD BITS | Location From Which to Obtain Result |
| --- | --- |
| 00 | Register File |
| 10 | Result Return Data Path 16 |
| 11 | Result Return Data Path 26 |

In one embodiment, two bits for each register are used to represent the total possible number of locations for result sources, and the logical inverse value of both are provided as inputs into AND gate 82. If both bits are 0, then the result is to come from register file 104, so the value in register file 104 is selected and passed through to the execution unit. If the first bit is not a zero, then the second bit is also examined to see from which result return data path the result is coming. The result return data path indicates the register address at which the data is placed.

Comparator 88 indicates when the pertinent result appears on the result return data path because it could be any number of cycles before the pertinent result appears. In the meantime, several other results can travel over that bus so the bypass control circuit ensures that not only is the system notified of the result return data path of the pertinent result, the system receives the pertinent result off of the right result return data path.

Rather than comparing against all the possible result return data paths that might return the result and selecting among those, a result return data path can be identified so that only results returning to register file 104 on that result return data path are examined for their destination address. For example, in a system with five result return data paths returning results, instead of requiring five comparators in the bypass control circuit, bypass control circuit 80 is modified to only use a single comparator with the only changes being a five input MUX instead of a two input MUX and an increase in the number of bits stored in scoreboard/result return data path indicator 100 to indicate five possible result return data paths.

An OR gate 102 receives the signals from $S_{RF}$ 84, $S_{RP16}$ 96, and $S_{RP26}$ 98 and logically OR's them together so that if any one of them are true, a valid result is available (i.e., the operand is "ready") and can be sent (i.e., bypassed or read directly from the register file) to execution unit 10, possibly at the same time the result is being sent to register file 104.

After the valid result is returned to register file 104, the two bits associated with indicating the status of the result in register file 104 in scoreboard/result return data path indicator 100 is cleared (i.e., set to logical zeros), to indicate that the result in register file 104 is now valid.

The system shown in FIG. 3 and described above works well in systems that do not allow multiple instructions that all return a result to the same register address to be executing simultaneously. This is the case in many processors. However, increased performance can often be obtained by loosening this restriction, and allowing multiple instructions that all return their result to the same register to be executing simultaneously, even if other instructions are issued between them that use those results. Increased performance can also be gained in this situation if the instructions can return their results in an order different from the order in which they were issued. This is called out-of-order execution. In this case, additional efforts must be made to ensure that instructions are executed using the right input values.

Figure 4:
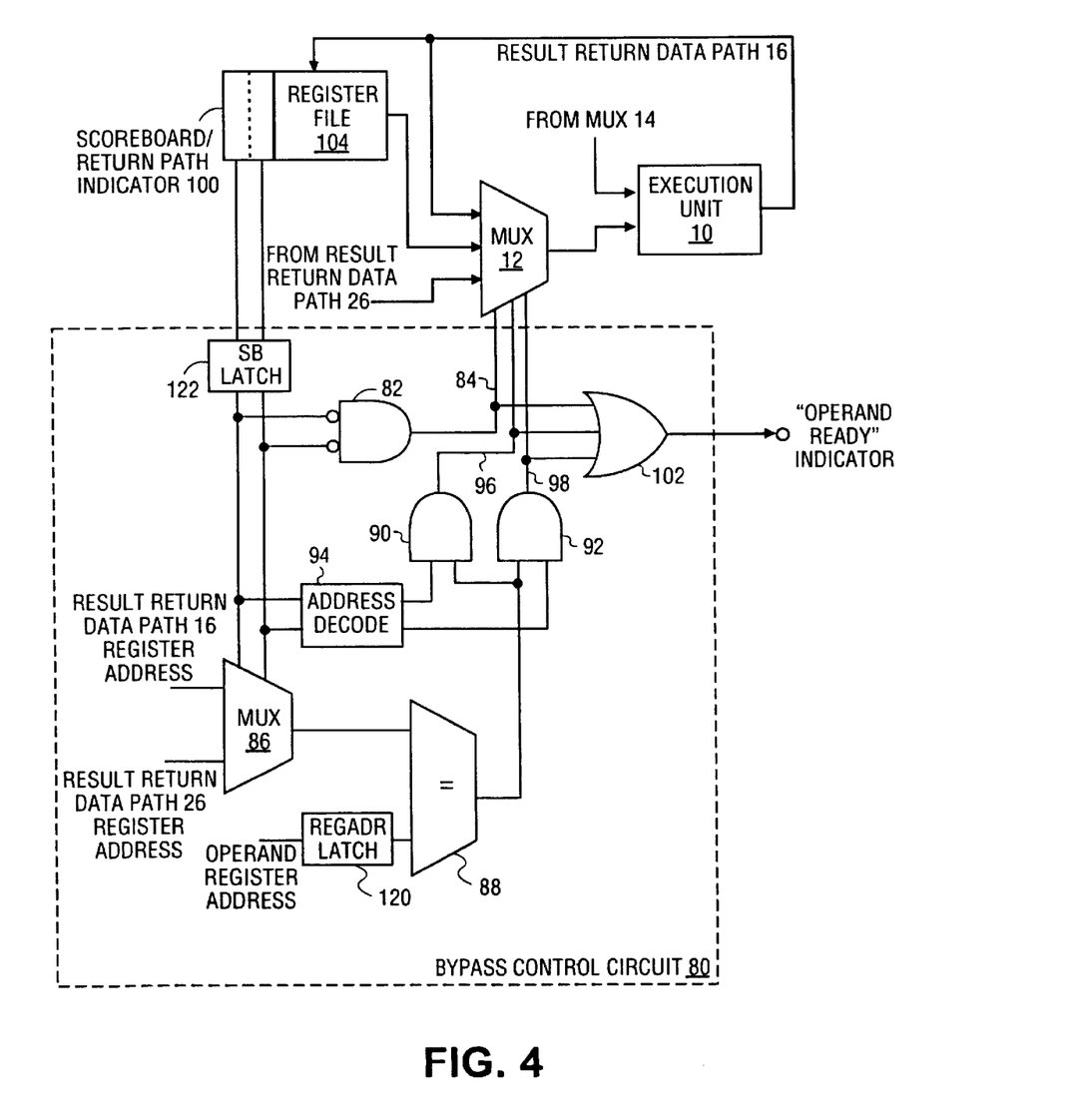
FIG. 4 is a system for bypassing data configured in accordance with another embodiment of the present invention.

FIG. 4 is a block diagram of bypass control circuit 80 which is modified to prevent a write-after-write (WAW) hazard. A WAW occurs in a processor when different instructions return results to the same register location in an order different than the order in which those instructions were issued.

For example, Table 2a contains an example of a WAW hazard situation where four instructions are issued:

TABLE 2a

WAW Hazard

| INSTRUCTION | Execution Unit | RETURN PATH |
| --- | --- | --- |
| LOAD(4, R1) | Execution Unit 10 | Result Return Data Path 16 |
| ADD(R1, R2, R3) | doesn't matter | doesn't matter |
| MOV(8, R1) | Execution Unit 20 | Result Return Data Path 26 |
| ST(R1, 12) | doesn't matter | doesn't matter | where LOAD(X,Y) is an instruction that loads a value X into register Y; ADD(X,Y,Z) adds a value X and a value Y and place the result in a location Z; MOV(X,Y) is an instruction that moves the data at a memory location X into a register Y; and ST(X,Y) is an instruction that stores the value in a register X into a memory location Y. The Execution Unit column indicates which execution unit to which the instruction issues, and the Return Path column indicates on which return path the result of the instruction returns.

A WAW can occur when the LOAD and MOV instructions return their results either in an out-of-order or parallel fashion. Without WAW protection, the MOV instruction can execute and finish before the LOAD instruction. When the LOAD instruction finishes execution after the MOV instruction, R1 is loaded with the value of 4, which overwrites the value of 8 returned by the MOV instruction. Thus, the ST instruction, instead of correctly storing a value of 4 into memory location 12, incorrectly stores the value of 8 into memory location 12.

To prevent WAW errors, scoreboard/result return data path indicator 100, which indicates the pertinent return path on which a result is to return, can be used to allow a subsequent instruction which is to use that result to monitor for the data to return on the pertinent return path. In one embodiment, subsequent instructions that also use that same return path to return a value to the same register are not allowed to issue. Subsequent instructions that return a result either to a different register or using a different path are allowed to issue. The combination of the register the result is intended for and the return path it is returning are combined to uniquely identify the result. The execution unit assigned to process a subsequent instruction that is waiting for a result is given this unique register/return path pair (instead of just the register as would be done in the prior art) when that subsequent instruction is issued, and stores/uses this unique identification to ensure that the subsequent instruction only uses the appropriate result.

Using the example given in Table 2a to illustrate this process, first the load instruction issues. Assume that the load takes an arbitrarily long time to complete. When the next instruction that uses the result of the load issues (the ADD instruction) the execution unit that the instruction is assigned to is given both the register address (R1) and the result return data path (16), and begins to wait for the result ("R1 on result return data path 16") to appear. Then the MOV instruction issues. Assume that the MOV instruction does not return its result immediately. Then the ST instruction issues, and the execution unit it is assigned to is given "R1 on result return data path 26" to look for.

In one scenario, the LOAD instruction may return its result first. In this case, the unit executing the ADD instruction sees the result being returned on result return data path 16 and bypasses the result into itself. The unit executing the ST instruction is not monitoring result return data path 16 and therefor does not see a result being returned to R1. Later, when the MOV instruction returns its result on result return data path 26, the unit executing the ST instruction sees that result and bypasses it into itself.

In another possible scenario, the MOV instruction may return its result before the LOAD instruction. In this case, the unit executing the ST instruction sees the result, since it is being returned on result return data path 26, and the unit executing the ADD instruction does not see the result, since it is not on result return data path 16. Therefore, the unit executing the ST bypasses the result into itself, and the unit executing the ADD does not. Later, when the LOAD instruction returns its (out-of-order) result via result return data path 16, the unit executing the ADD instruction sees the result and bypasses it into itself.

In both scenarios, through the use of the result return data path information in combination with the register address, each operation was furnished with the correct input values. This would also have been true in the third possible scenario, where both results are returned simultaneously.

Out-of-order result returns to the register file itself (as opposed to returns to the bypass mechanisms) can be handled by a number of mechanisms, depending on the requirements of the instruction set architecture. Reorder buffers are one possible solution, which hold out-of-order results until all the instructions issued before the one that generated the result have returned their results. This mechanism reorders the out-of-order results so that they are written to the register file in the original program order. Some architectures, however, may be able to exploit this invention to simplify the process that writes results to the register file.

If a processor can guarantee that all instructions, once issued, will return a result, then a result that returns to the register file may be discarded (instead of being written to the intended register) if there is another instruction, issued after the one that generated this result, that will or has already returned a result to the same register. This is because all already-issued instructions that required this particular result will have obtained it through the bypass mechanisms, and all instructions that have not yet issued will not require this result, but will instead require the result generated by the subsequent instruction that has already issued. If this is the case, then the information in the scoreboard bits can be used to control writes to the register file. For each register, the scoreboard bits either contain the result return data path that the most recently issued instruction that returns a result to this register will use, or it indicates that the most recently issued instruction that returns a result to this register has completed execution and has returned its result. In either case, if a result is returned that does not match the expectations of the scoreboard bits, it could only have come from an instruction that was issued before the most recent one that returns or returned a value to this register, and the returned result can therefor be safely ignored.

If this mechanism for controlling the writing of results to the register file is employed, then in the example give in table 2a, assuming that the MOV instruction issues before the LOAD instruction returns its result, then regardless of whether the LOAD operation returns its result before or after the MOV operation returns its result, the LOAD operation's result will not be written into R1. This is because the scoreboard bits are indicating that the most current result for R1 will arrive on result return data path 26, not on result return data path 16, which is what the LOAD uses to return its result. The ADD operation, however, will still receive the correct value, via the bypass mechanisms previously discussed.

FIG. 4 is a block diagram of the circuit of FIG. 3 modified to handle write-after-write (WAW) hazards, including an Sb latch 122 and a regadr latch 120 that hold the required information on the source of the inputs. The figure shows only the bypass control logic for MUX 12. An identical circuit is used to control MUX 14. Execution unit 10 has the ability to latch the input it receives from MUX 12 and MUX 14, when the "Operand Ready" indicator associated with each is true. It also must to latch the operation to be performed when that operation is issued to it. When execution unit 10 has received and latched all of the inputs needed for the operation it has been issued, execution unit 10 then performs the stored operation and returns the result via result return data path 16.

When an instruction to be executed is issued to execution unit 10, the following operations occur:

1. Execution unit 10 latches the instruction to be executed.
2. Bypass control circuit 80 latches the register address and access paths specifier for the operand that will be delivered through MUX 12. The access path specifier is derived from the information in scoreboard/return path indicator 100 and indicates that the operand will be obtained from either register file 104, result return data path 16, or result return data path 26.
3. Bypass control circuit for MUX 14 (not shown), which in one embodiment of the invention is identical to bypass control circuit 80 that controls MUX 12, latches the register address and access path specifier for the operand that will be delivered through MUX 14

Bypass control circuit 80 then functions in one of the three following mutually-exclusive manners:

1. If the access path specifier latched in Sb latch 122 indicates that the result is to be obtained from register file 104, then MUX 12 is controlled so that the value on the input connected to register file 104 is presented on the output of MUX 12. After this has been accomplished, the assertion of the "Operand Ready" indicator causes execution unit 10 to latch the value of the input that is connected to the output of MUX 12.
2. If the access path specifier latched into Sb Latch 122 indicates that the operand will be obtained from result return data path 16, then MUX 86 is controlled so that result return data path 16 register address is presented on its output, and therefor to one of the inputs of comparator 88. Address decoder 94 produces a true value on the output connected to AND gate 90, and a false value on the output connected to AND gate 92. When result return data path 16 contains the value to be written to a register, the address of that register appears on result return data path 16 register address. When this is equal to the register address stored in regadr latch 120, the output of comparator 88 becomes true. This causes the output of AND gate 90 to become true, since both of its inputs are true. The output of AND gate 90 being true causes MUX 12 to be controlled so that the value on result return data path 16 is routed to the output of MUX 12. The output of AND gate 90 being true also causes the "Operand Ready" indicator to become true. This causes the execution unit 10 to latch the value being output by MUX 12.
3. If the access path specifier latched into Sb Latch 122 indicates that the operand will be obtained from result return data path 26, then MUX 86 is controlled so that the result return data path 26 register address is presented on its output, and therefor to one of the inputs of comparator 88. Address decoder 94 produces a true value on the output connected to AND gate 92, and a false value on the output connected to AND gate 90. When result return data path 26 contains the value to be written to a register, the address of that register appears on result return data path 26 register address. When this is equal to the register address stored in regadr latch 120, the output of comparator 88 becomes true. This causes the output of AND gate 92 to become true, since both of its inputs are true. The output of AND gate 92 being true causes MUX 12 to be controlled so that the value on result return data path 26 is routed to the output of MUX 12. The output of AND gate 92 being true also causes the "Operand Ready" indicator to become true. This causes the execution unit 10 to latch the value being output by MUX 12.

After one of these three actions has occurred, execution unit 10 will have latched the correct value for the operand that is to be obtained through MUX 12. In one embodiment of the invention, an identical process occurs with respect to the operand that is to be obtained through MUX 14. When both of these processes have completed, execution unit 10 can proceed with the execution of the instruction it was issued.

It is to be noted that in describing the workings of the system, only a limited number of execution units and other components is used. However, the system can be scaled to handle unlimited numbers of execution units, return paths, and components. It is also to be noted that in describing the workings of the system, only a single execution unit was associated with each data return path. However, the system allows any number of execution units to return data on the same return path, and also allows one execution unit to return results on multiple return paths.

While the present invention has been particularly described with reference to the various figures, it should be understood that the figures are for illustration only and should not be taken as limiting the scope of the invention. Many changes and modifications may be made to the invention, by one having ordinary skill in the art, without departing from the spirit and scope of the invention. It should also be understood that many of the details of the timing and control circuitry needed to create a complete processing system form the invention are not described in detail, but that these may be readily constructed by one having ordinary skill in the art, without departing from the spirit and scope of the invention.

What is claimed is:

1. A method comprising
    providing a set of data storage units, the set of data storage units comprising a set of scoreboard return path bits associated with the set of data storage units, the set of scoreboard return path bits comprising a set of return path indicators;
    providing a first execution unit to provide an output based on an input;

providing a first switching unit to select the input to the first execution unit and to receive the output from the first execution unit; and providing a first bypass control unit to cause the first switching unit to couple the output from the first execution unit to the first execution unit based upon the set of scoreboard return path bits such that the input to the first execution unit is selected from among the set of data storage units and the output from the first execution unit.

2. The method of claim 1, wherein the output of the first execution unit comprises at least one of an address and a result.

3. The method of claim 2, wherein the set of scoreboard return path bits comprise a set of data to indicate if the result is to be received from the first execution unit.

4. The method of claim 2, wherein the providing the bypass control unit comprises:

providing an operand address comparator coupled to receive a return path address and a first operand address, and to output a comparator output, the comparator output comprising a match signal when the address of the output of the first execution unit matches the first operand address;

providing an output circuit coupled to receive a comparator output from the operand address comparator, to receive an inverse value of each scoreboard return path bit in the set of scoreboard return path bits, to receive the set of scoreboard return path bits, and to output a select signal;

providing a first return path address switching unit to receive the address from the first execution unit, to receive a second address of a second output of a second execution unit, and to output a return path address to the operand address comparator based on the set of scoreboard return path bits, the return path address comprising one of the address of the output of the first execution unit and the second address of the second output of the second execution unit.

5. The method of claim 2 further comprising:

providing a second execution unit such that the first bypass control unit causes the first switching unit to couple a second output of the second execution unit to the first execution unit based upon the set of scoreboard return path bits.

6. The method of claim 5 further comprising: providing a second switching unit to provide a switching output to the first execution unit and to receive the output of the first execution unit; and providing a second bypass control unit to cause the second switching unit to couple the second output of the second execution unit to the second execution unit based on the set of scoreboard return path bits.

7. The method of claim 4 further comprising:

providing an operand ready indicator circuit to receive the select signal from the output circuit.

* * * * *